_(12)_ United States Patent
Chang et al.

(10) Patent No.: US 7,856,616 B2
(45) Date of Patent: Dec. 21, 2010

(54) ACTION-BASED IN-PROCESS SOFTWARE DEFECT PREDICTION SOFTWARE DEFECT PREDICTION TECHNIQUES BASED ON SOFTWARE DEVELOPMENT ACTIVITIES

(75) Inventors: Ching-Pao Chang, Taliau Shiang (TW); Chih-Ping Chu, Tainan (TW)

(73) Assignee: National Defense University, Taoyuan County (TW)

( * ) Notice: Subject to any disclaimer, the term of this patent is extended or adjusted under 35 U.S.C. 154(b) by 917 days.

(21) Appl. No.: 11/736,325

(22) Filed: Apr. 17, 2007

(65) Prior Publication Data

US 2008/0263507 A1    Oct. 23, 2008

(51) Int. Cl.
*G06F 9/44* (2006.01)
*G06F 11/00* (2006.01)
(52) U.S. Cl. ............................ 717/101; 714/37; 714/38
(58) Field of Classification Search ......... 717/100–103, 717/124–135; 714/37, 38
See application file for complete search history.

(56) References Cited

U.S. PATENT DOCUMENTS

| | | | |
|---|---|---|---|
| 6,477,471 B1 * | 11/2002 | Hedstrom et al. | 702/34 |
| 7,337,124 B2 * | 2/2008 | Corral | 705/9 |
| 7,401,321 B2 * | 7/2008 | Sit et al. | 717/125 |
| 7,614,043 B2 * | 11/2009 | Ognev et al. | 717/126 |
| 7,757,125 B2 * | 7/2010 | Bassin et al. | 714/38 |
| 2003/0188290 A1 * | 10/2003 | Corral | 717/101 |
| 2004/0205727 A1 * | 10/2004 | Sit et al. | 717/125 |
| 2005/0071807 A1 * | 3/2005 | Yanavi | 717/104 |
| 2005/0289503 A1 * | 12/2005 | Clifford | 717/101 |
| 2006/0041857 A1 * | 2/2006 | Huang et al. | 717/104 |
| 2007/0074149 A1 * | 3/2007 | Ognev et al. | 717/101 |
| 2008/0201611 A1 * | 8/2008 | Bassin et al. | 714/37 |
| 2008/0201612 A1 * | 8/2008 | Bassin et al. | 714/38 |

OTHER PUBLICATIONS

Yu et al., "An Analysis of Several Software Defect Models," 1988, IEEE, p. 1261-1270.*
McConnell, Steve, "Gauging Software Readiness with Defect Tracking," 1997, IEEE, p. 135-136.*
Fenton et al., "A Critique of Software Defect Prediction Models," 1999, IEEE, p. 675-689.*
Mohapatra et al., "Defect Prevention through Defect Prediction: A Case Study at Infosys," 2001, IEEE.*
Chang et al., "A Defect Estimation Approach for Sequential Inspection Using a Modified Capture-Recapture Model," 2005, IEEE.*

(Continued)

*Primary Examiner*—Wei Y Zhen
*Assistant Examiner*—Qing Chen

(57) ABSTRACT

An action-based in-process software defect prediction (ABDP) applies classifying records of a performed action to predict whether subsequent actions cause defects in a project. A performed action is previously defined herein as an operation performed based on tasks in Work Breakdown Structure (WBS) of the project. Rather than focusing on the reported defects, ABDP discovers the patterns of the performed action that may cause defects composing a historic data set, and uses analytical results to predict whether the subsequent actions are likely to generate defects composing another historic data set. Once actions with high probability of causing the defects are identified, stakeholders review these actions carefully and take appropriate corrective actions to create a fresh performed action. The fresh performed action is continually appended to the historic data sets of amending the defects to construct a new prediction model for further subsequent actions.

12 Claims, 7 Drawing Sheets

OTHER PUBLICATIONS

Sherriff et al., "Early Estimation of Defect Density Using an In-Process Haskell Metrics Model," Jul. 2005, ACM, p. 1-6.*

Wagner et al., "Software Quality Economics for Defect-Detection Techniques Using Failure Prediction," Jul. 2005, ACM, p. 1-6.*

Chang et al., "The Defect Detection Time Approach for Estimating the Defect Number," Mar. 2007, Journal of Software Engineering Studies, p. 30-43.*

* cited by examiner

US 7,856,616 B2

ACTION-BASED IN-PROCESS SOFTWARE DEFECT PREDICTION SOFTWARE DEFECT PREDICTION TECHNIQUES BASED ON SOFTWARE DEVELOPMENT ACTIVITIES

BACKGROUND OF THE INVENTION

1. Field of the Invention

The present invention relates to a software defect prediction technique, and more particularly to provide a software defect prediction technique that is based on software development activities.

2. Description of Related Art

The common approaches used to predict defects of software development process are based on the maintenance records of software products which can be collected from different releases of software products. The prediction model built from collected data can be employed to predict the software defects. However, utilizing multiple release data to discover the defect patterns is that the features of the actions performed on different releases of products may be different owing to changes in resources in the project, and cannot be applied to in-process prediction.

Conventional defect prevention was first proposed by IBM Corporation to prevent future defects from occurring in its products. The main steps of defect prevention are a kickoff meeting, a causal analysis and an action item meeting. The causal analysis is an important step of the defect prevention process where the analysis meeting and interviewing with stakeholders are commonly used in this step. The most significant challenge for causal analysis is to identify the causes of defects among large amounts of defect records where the cause-effect diagram and control chart are utilized to support the analysis process.

The conventional defect prevention used to predict defects are based on the prediction models which are built from historic records of software work products. In addition to the work products, there are many factors which may cause defects, such as the experience of designer and development environment. To increase the prediction accuracy, these factors need to be considered.

SUMMARY OF THE INVENTION

A main objective of the present invention is to provide an action-based in-process defect prediction that builds prediction models from the records collected from an ongoing project and predicts whether the subsequent actions cause defects in the same project.

To achieve foregoing main objective, the action-based in-process software defect prediction (ABDP) comprising steps of:

applying classifying records of performed actions to predict whether subsequent actions cause defects in a project, wherein a performed action is previously defined as an operation performed based on tasks in Work Breakdown Structure (WBS) of the project;

discovering patterns of the performed action that causes defects that compose a first historic data set;

using analytical results to predict whether the subsequent actions are likely to generate the defects that compose a second historic data set;

reviewing and correcting the performed action and the subsequent actions by stakeholders to create a fresh performed action once the performed action and the subsequent actions with high probability of causing the defects;

appending the fresh performed action with the first and second historic data sets for amending the defects to construct a prediction model for further subsequent actions; and functioning the prediction model to mine possible defects before executing the subsequent actions Further benefits and advantages of the present invention will become apparent after a careful reading of the detailed description with appropriate reference to the accompanying drawings.

DETAILED DESCRIPTION OF THE INVENTION

Figure 1:
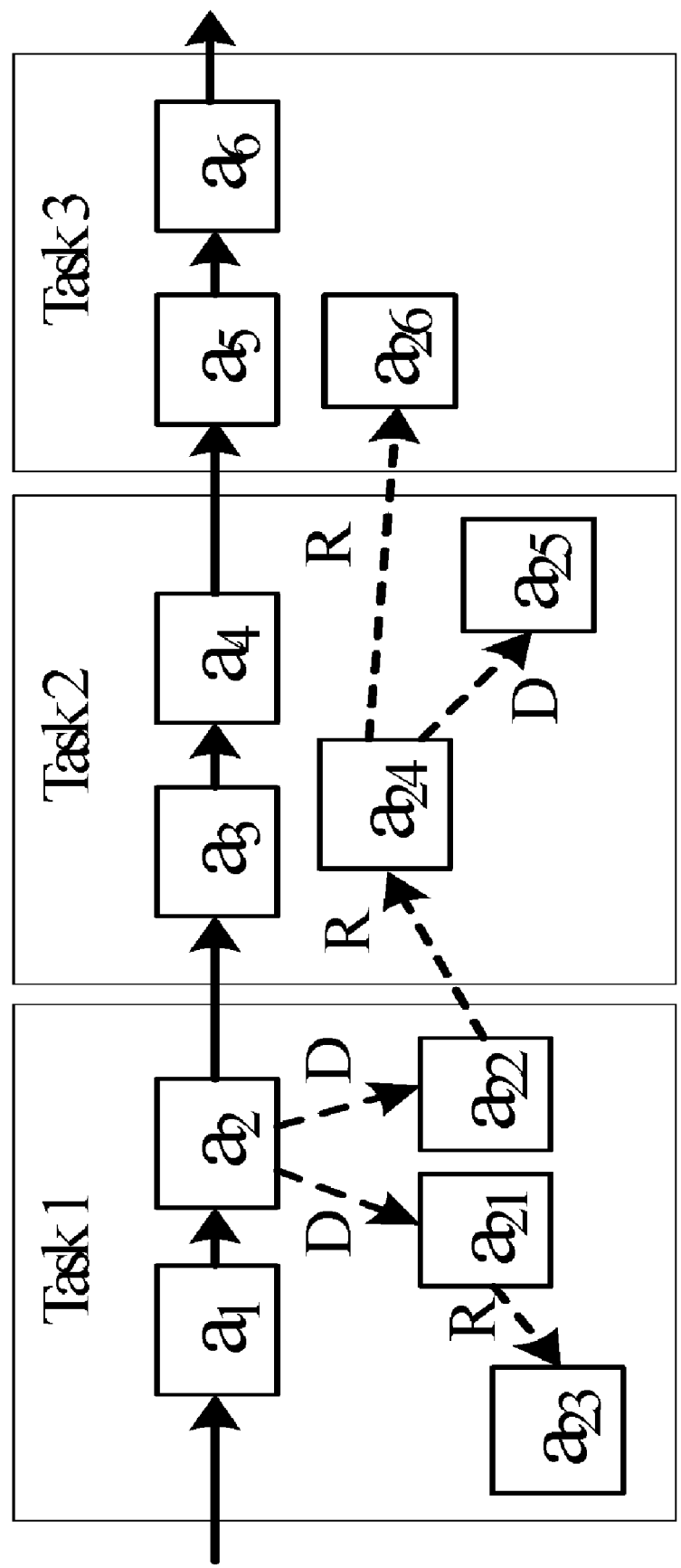
FIG. 1 is a block diagram showing a relation between R and D root actions.

An action-based in-process software defect prediction (simply cited as ABDP in the following) in accordance with the present invention applies classifying records of a performed action to predict whether subsequent actions cause defects in a project. A performed action is previously defined herein as an operation performed based on tasks in Work Breakdown Structure (WBS) of the project. Rather than focusing on the reported defects, ABDP discovers the patterns of the performed action that may cause defects composing a historic data set, and uses analytical results to predict whether the subsequent actions are likely to generate defects composing another historic data set. Once actions with high probability of causing the defects are identified, stakeholders review these actions carefully and take appropriate corrective actions to create a fresh performed action. The fresh performed action is continually appended to the historic data sets of amending the defects to construct a new prediction model for further subsequent actions.

In addition to degrading the quality of software products, software defects also require additional efforts in rewriting software and jeopardize the success of software projects. Software defects should be prevented to reduce the variance of projects and increase the stability of the software process. Factors causing defects vary according to the different features of a project, including the experience of the developers, the product complexity, the development tools and the schedule. The most significant challenge for a project manager is to identify actions that incur defects before the action is performed. Actions performed in different projects yield different results, which are hard to predict in advance. To alleviate this problem, an Action-Based Defect Prevention (ABDP) approach is proposed and applies the classification and Feature Subset Selection (FSS) in a data processing for creating data sets for a data analysis to project data during execution to create the prediction model (see FIG. 4).

Accurately predicting actions that cause many defects by mining records of performed actions is a challenging task due to the rarity of such actions. To address this problem, an under-sampling and FSS are applied to increase precision of predictions for the subsequence actions. The under-sampling is a techniques used to reduce the number of the majority cases to the same number of rarity cases. The main advantage utilizing ABDP is that the actions likely to produce defects can be predicted prior to their execution. The detected actions not only provide the information to avoid possible defects, but also facilitate the software process improvement.

The execution of the software process is operationally treated as a sequence of actions executed to achieve the objective of the project. The ABDP approach proposed herein treats the action as the basic operations used to execute the task scheduled in WBS of project. Each action has a different scale which can be as small as an operation to correct a bug or as large as a work to code a module. The execution of an action can be divided into three stages, namely planning, executing and reporting. The planning stage is to plan an execution of the action such as a description of the action, required resources of the action and work products of the action to be performed. The stakeholders then can execute the planned action. The results of the action, such as actual efforts used to execute the action, are reported after execution.

A set of features is defined to collect the data from the performed action as in Table 1. The expected actual efforts and complexity of the actions are evaluated by the stakeholder who executes the action in advance. The originator denotes the stakeholder who invokes the action. The originator may not be the same person as the stakeholder who executes the action. Although the actions vary in size, this preferred embodiment stipulates that one action can only be executed by one person in one task to reduce the complexity of individual factors.

TABLE 1

The main features of the actions

| Features | Description |
| --- | --- |
| act_id | the action id |
| Task_id | the task which is performed by the action |
| act_desc | description of the action |
| act_date | the date to perform the action |
| act_state | indicate if the action is scheduled |
| act_type | the type of one action, such as N (create new module), M (modify, existing code), . . . etc |
| complexity | the complexity of the action (0: low, 10: high) |
| object_num | the number of modules which are going to be changed or modified by this action |
| originator | the stakeholder who invokes the action, such as the programmer, manager or customer |
| Reaction | the action is invoked by another action |
| effort_exp | estimate the actual efforts need to perform the action |
| effort_used | the actual efforts used to perform the action |

In practice, the execution of an action is not a single event and may cause other modules to be changed. For example, changes to the DB API (Database Application Interface) lead to further changes to all modules that use the API, wherein these modules may be developed by different people. To represent the relation of actions in WBS, a reaction denoted as R action is used to indicate that a task action is invoked by another task action (shown in FIG. 1) which may produce a defect, if the R action is not performed on time (i.e. certain modules do not change when the used API has been changed). The action used to remove defects is defined as a D action. The action, neither the R nor D action, is defined as a root action. Table 2 lists the main features of defects wherein the expected and actual used efforts to fix the defects are retrieved from the expected and used efforts of Act_removed (the action used to remove the defect).

TABLE 2

The main features of defects

| Features | Description |
| --- | --- |
| Def_id | The defect id |
| Def_desc | description of the defect |
| Act_generated | The action which results the defect |
| Act_detected | The action which detects the defect |
| Act_removed | The action used to remove the defect |
| severity | severity of the defect |
| object_id | The module which causes the defect |

FIG. 1 shows a relationship between the R and D actions. Task actions a1, a2, a3, a4, a5 and a6 are scheduled actions expected and scheduled to be performed according to the task blocks 1, 2 and 3, whereas unscheduled actions are actions that can not be expected, such as a21 (caused by defects) and a23 (caused by other action). An action a22 is performed to address the defect caused by a21 and invokes two other actions a24 and a26 in two different tasks (Task 2 and Task 3). An action a25 may be a reaction that is not performed immediately after a24 on time and result in a defect which needs to be addressed by a25. The defects of one action may not be detected until the product is released and reported by the customers, and reported defects may not be easy to trace to the actions that caused them.

Predefined features used to collect the execution of actions are divided into two groups according to available time, the antecedent features which can be collected in the planning stage and the subsequent features which can only be gathered after the executing stage. For instance, the features shown in Table 1 are the antecedent features except the last feature—effort_used (the actual efforts used by the task or root actions) whose value is unknown until each task or root action is completed. The subsequent features include the number of defects generated by a corresponding task or root action, the total efforts used to correct these defects, and the number of severe defects generated by this task or root action. Although the effort_used is known once the task or root action is completed, the number of defects generated by the task or root action is known until the end of the project. The main aim of the ABDP approach is to predict that the number of defects generated by the task or root action is greater than a specific threshold (such as three defects in this embodiment) before the execution stage using the antecedent features of the task or root action.

Figure 2:
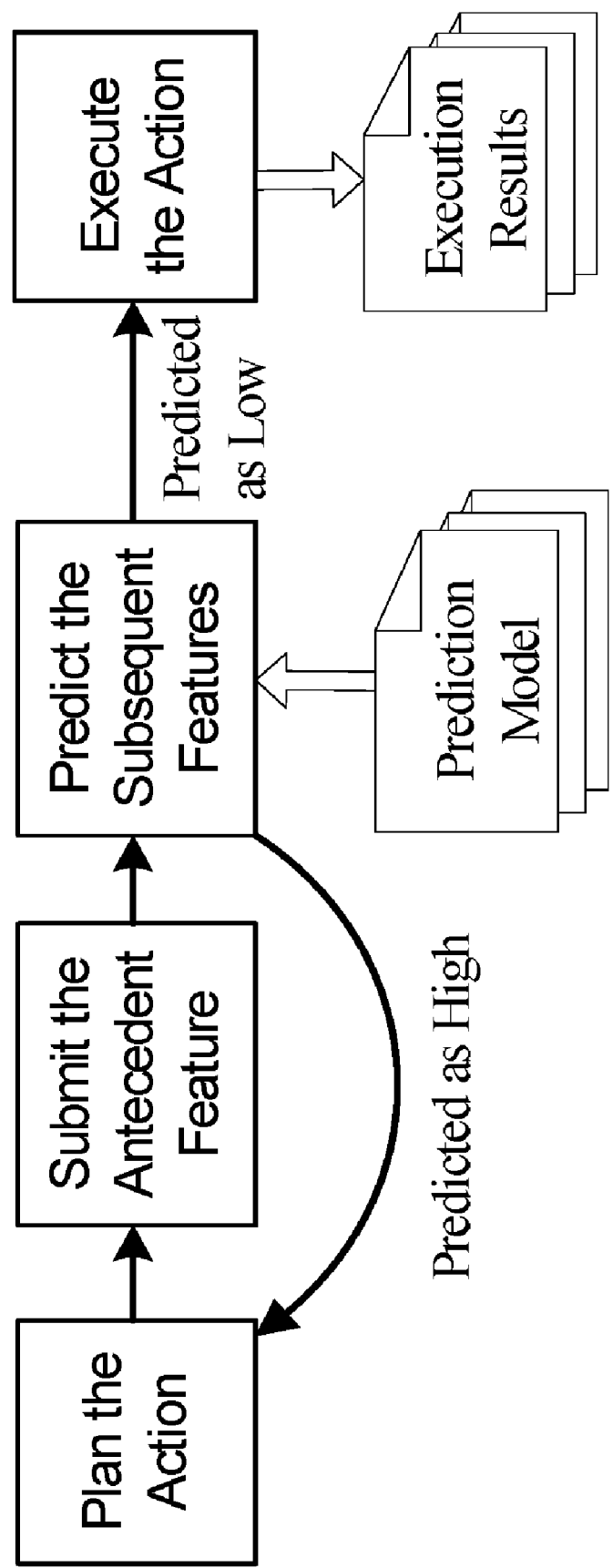
FIG. 2 is a block diagram showing processes for an execution of an action.

FIG. 2 shows the procedure for executing an action. First, the action is planned to determine the values of the antecedent features, such as action description, action type, originator and state. The antecedent features are then submitted to the prediction engine and are predicted by using the prediction model which is constructed from previously executed actions. The prediction engine responds with predictions of the submitted action. The submitted action may need to be re-planned if a High-defect action is predicted, where the submitted action is defined as a High-defect action if the number of defects generated by the submitted action is greater than 3, and as a Low-defect action otherwise.

Figure 3:
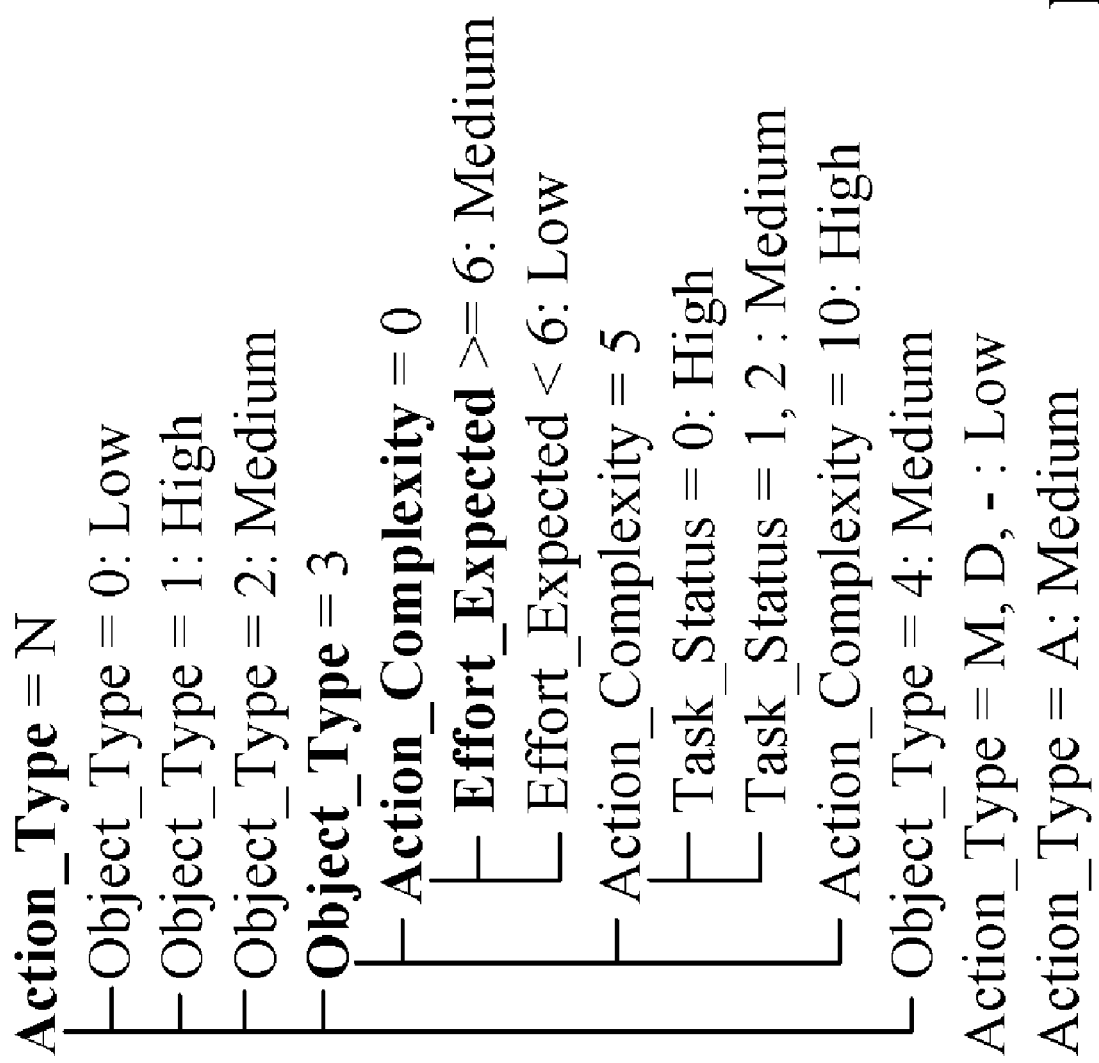
FIG. 3 is a block diagram showing a prediction model.

By using the ABDP approach, the performed actions can be used to build the prediction model. The number of defects of one action is operationally can be used to classify the action as low-defect (less than 3), medium-defect (between 3 and 5) and high-defect (more than 5). The prediction model then applied to predict the submitted action causes high defects or not. FIG. 3 shows one embodiment of the prediction model (a decision tree) built from the performed actions, where names of the features are listed as in Table 3. To perform a prediction model, the Action_Type of the submitted action is compared with the prediction model, and is predicted as Low-defect when the value of Action_Type is 'M', 'D' or '-'.

For instance, an action used to create a new module of a project can be planned as follows (only some of the features are shown).

Action_State=0 (scheduled)
   Action_Type=N (create a new module)
   Action_Complexity=0 (evaluated as Low complexity)
   Object_Type=3 (work on application)
   Num_of_action_objects=1 (one module will be worked on)
   Originator=4 (performed by programmer)
   Link_By=- (this is a root action)
   Effort_Expected=6 (the efforts expected to execute the action)

Figure 4:
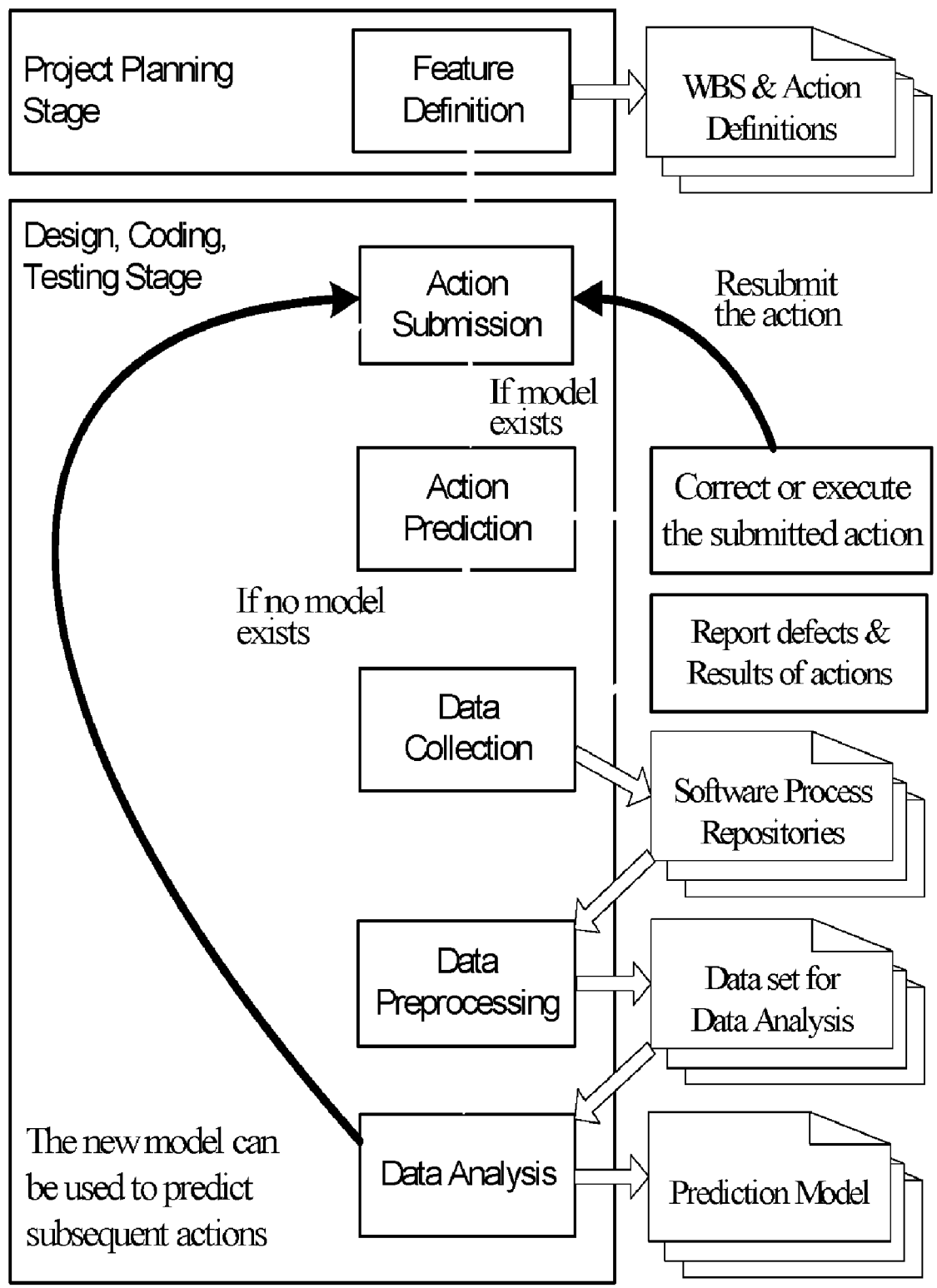
FIG. 4 is a block diagram showing architecture of the ABDP process in accordance with the present invention.

The submitted action with above features is predicted as High-defect according the values of Action_Type, Object_Type, Action_Complexity and Effort_Expected shown in FIG. 3 (The Medium and High are considered as the High-defect actions in this embodiment). To avoid High-defect actions, certain modifications on the submitted action can be performed, such as decomposing the action into two or more actions to reduce the value of Effort_Expected (such as below 6). The main aim of ABDP is to predict the possible defects during the software development by using the data from the same project, where the prediction model becomes stable when collected data increase. FIG. 4 shows the architecture of the ABDP process.

Definition of the feature is used to define feature sets (such as Table 1 and Table 2) to describe the features of one action, such as effort_used, action type, action complexity and task_id. The feature definition can be conducted during the project planning. The main objective of feature definition is to minimize the effort and maximize the application of existing processes for data collection. Although the ABDP can handle any feature set in a data analysis element (see FIG. 5) by using the FSS technique, defining one feature set used in the whole process of the project at the feature definition can facilitate data collection and analysis.

Figure 5:
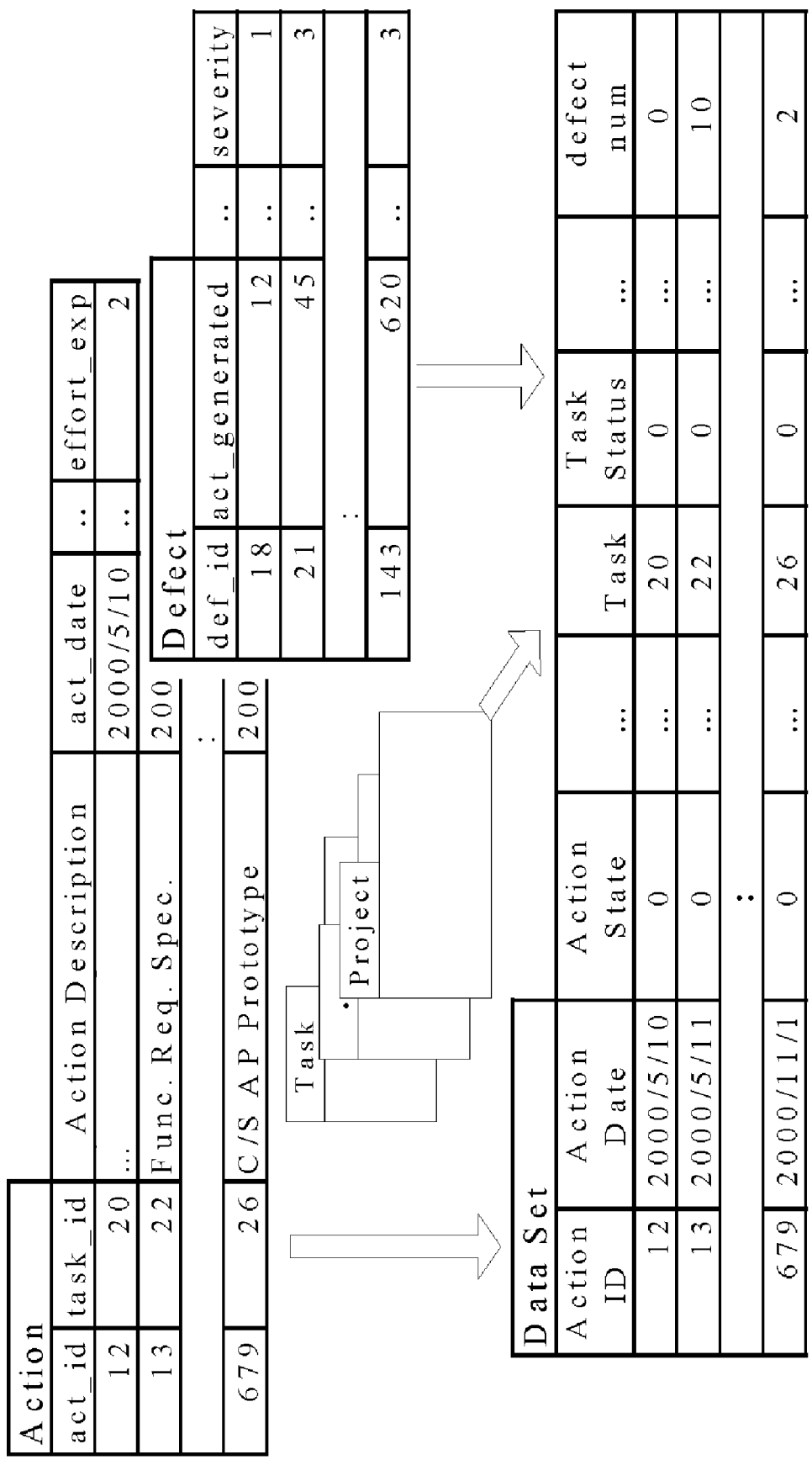
FIG. 5 is a block diagram showing a transformation for collected data.

The second component of the ABDP process as shown in FIG. 5 is the action submission which is used to submit a planned action for defect prediction element. The ABDP process serves as an iterative process, where each action is submitted before execution. The action submission can be achieved by using a process management system where the actor can input the information of the action and obtain the prediction results immediately.

The action prediction element is used to predict whether the subsequent action produces defects. The actions that are predicted as likely to produce many defects are reported to the manager to take a corrective action, while the actions that are predicted as causing no defects can be executed immediately where the information of the actions are recorded by the data collection elements of ABDP.

(1). The Data Collection and Data Preprocessing

To build the prediction model, the data of performed actions and generated defects need to be collected according to the defined features. The data collection elements are used to record the information of the actions that are ready to be preformed. The results of the performed actions (i.e. the actual efforts) and the reported defects are input in later stages. Besides the features listed in Table 1 and Table 2, other data related to the actions are considered for collection as well, such as the information concerning the actor and environments.

Since the collected data optionally reside at different locations (or databases), the collected data need to be transformed into a format that can be recognized by the data analysis component. FIG. 5 shows that the collected data located at different database tables are transformed into a table according to the features presented in Table 3. The last feature (defect num) of the transformed data set denotes the subsequent features to be predicted for submitted actions.

Figure 6:
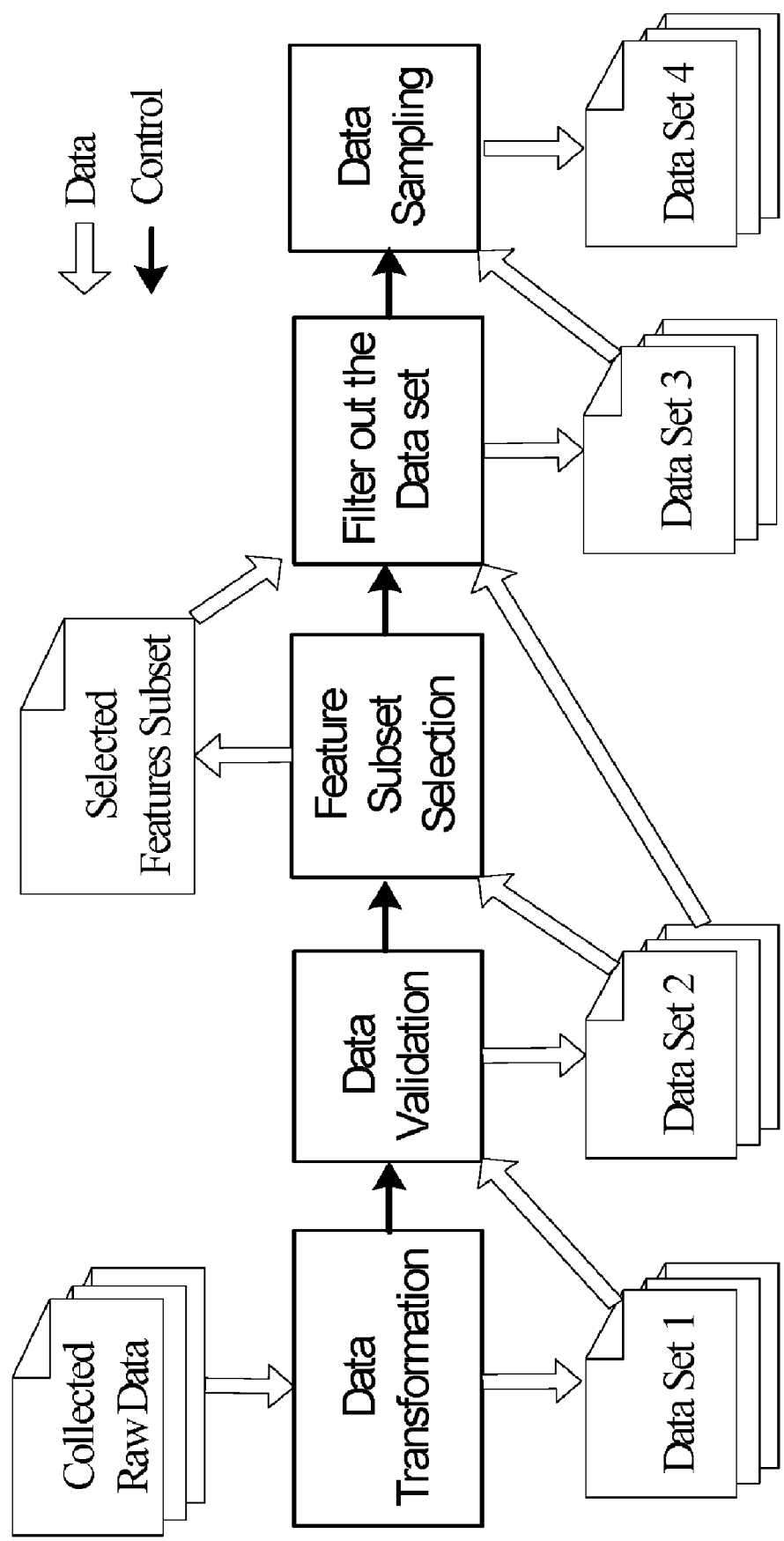
FIG. 6 is a block diagram showing a data processing of the ABDP.

As well as the data transformation, the data preprocessing also includes data validation, feature selection, data filtering and data sampling, which is expressed as FIG. 6 and described as follow. First, a raw collected data (including the data of performed actions and reported defects) are transformed into Data Set 1 according to the features listed in Table 3. Second, the Data Set 1 is validated by checking the values against the valid range, which is defined by the feature definition element. Each input datum is checked in the data collection element to find problematic data out. The problematic data entries are submitted to the manager for further analysis.

Third, the FSS technique is used to filter out unnecessary features from the data sets. The Data Set 2 is used to build a correlation matrix (using the whole data set as the training data set by default) and find the best feature subset using a best-first search. The Correlation-based Feature Selection (CFS) is a popular filter algorithm, which evaluates and ranks the intercorrelation among the feature subset rather than individual correlations, where both the continuous and discrete attributes can be measured by the CFS. In ABDP approach, the CFS is selected as an evaluator to evaluate the worth of the feature subset, and the best-first search is used to reduce the search space of the feature subset selection. The Fourth, the selected feature subset then is used to find out the desirable data, where the data of unselected features are removed.

Fifth, the data sampling step is to sample the major class using under-sampling (by default) and generates the final data set (Data Set 4) to be analyzed by the data analysis element. The data sampling step is applied to address rarity problem, which cause the decision tree to classify all submitted actions to the major class (predicted as Low-defect action). The rarity problem is due to that the number of Low-defect actions (the major class) and the number of High-defect actions (the rare class) are quite different. To reduce the difference between the number of major class and rare class, two sampling techniques can be applied, named the over-sampling and under-sampling. The over-sampling is used to duplicate rare classes, and thus address imbalance problems. However, the over-sampling sometimes cause overfitting problem, since duplication of the over-sampling does not generate new rare class data. Rather than duplicating the rare class data, the under-sampling applied in this embodiment reduces the number of major class data, and is effectively used with a C4.5 algorithm, a techniques which can be used to build the classification tree and can deal with both discrete and continuous features.

(2) The Data Analyzing

The data analysis element is used to analyze the data by using classification tree techniques and build the prediction model from the data set prepared by the data preprocessing. The prediction model then is used to predict the subsequent actions. The prediction model is kept updated when the performed actions and the defect records are reporting during project execution to create an updated prediction model. The updated prediction model then is used to predict several subsequent actions. The decision tree in ABDP is built using the C4.5 algorithm, which handle both discrete and continuous data. The C4.5 algorithm used to build the decision tree has been utilized in many research areas and produces good prediction results. The CFS with the best-first search is used to improve prediction accuracy of the C4.5 algorithm.

(3) The Prediction Model Construction

Instead of using the data collected from the previous project to build the prediction model, the ABDP approach builds the prediction model using the data collected from the current process to increase the prediction accuracy (since the actions used to build the prediction model have many similar features to the submitted action, such as the stakeholders, environments and work products).

Figure 7:
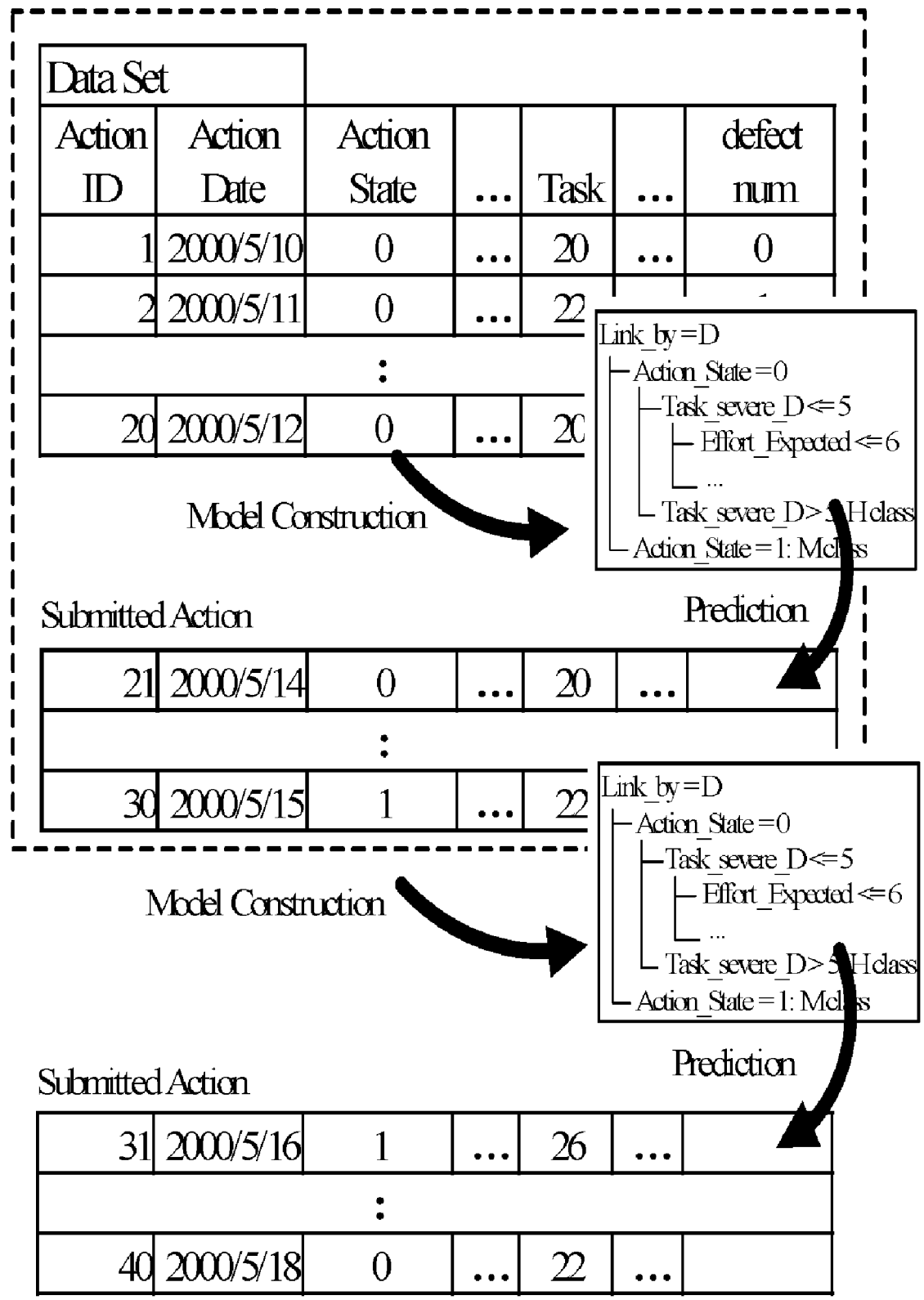
FIG. 7 is a block diagram showing the ABDP process.

FIG. 7 shows the data set following the data preprocessing as in FIG. 5, where the performed actions of the software process can be listed by action_date (the date that the action is executed). Submitted actions at the beginning of the project (the actions 1-20) are not able to be predicted since no prediction model is applied to them. After some actions (20 actions in this embodiment) are performed, the prediction model is then built by using the executed actions (the actions 1-20). The built prediction model then is used to predict the subsequent actions, in this case actions 21-30. The prediction model is then updated after action 30 is performed, where the performed actions 1-30 are used as the training data set to build an updated prediction model. The updated prediction model is then used to predict the following submitted actions (the actions 31-40). The prediction model continues to be updated after certain submitted actions are performed until the end of the project.

The submitted actions need to be preprocessed to generate the format that is the same as the data set used to build the prediction model. The number of defects in the submitted actions is the feature that needs to be predicted, and is unknown prior to execution.

The prediction model is updated after a specific number of performed actions or after a specific time interval, such as one day or one week. For instance, the prediction model is updated at the midnight every day to ensure that subsequent actions are not submitted when updating the prediction model. However, the manager can evaluate the interval in selection.

According to above description, the action-based in-process software defect prediction has the following advantages:

1. In-process prediction: The data used to construct the prediction model are obtained from the same project that decreases the variance between different projects.

2. Requires less effort to collect data: Actions and defect reporting are common procedures for most software teams, and the required data can be collected from these reports.

3. Reduces the effort in identifying the problem in the process: The detected actions that are likely to cause defects can be further analyzed and reviewed in the causal analysis meeting, thus to reduce the effort involved in identifying problematic actions.

Although the invention has been explained in relation to its preferred embodiment, it is to be understood that many other possible modifications and variations can be made without departing from the spirit and scope of the invention as hereinafter claimed.

What is claimed is:

1. An action-based in-process software defect prediction (ABDP) method, executing on a computer having a processor and a memory, comprising steps of:

applying classifying records of performed actions to predict whether subsequent actions cause defects in a software project, wherein a performed action is previously defined as an operation performed based on tasks in Work Breakdown Structure (WBS) of the software project;

discovering patterns of the performed action that causes defects that compose a first historic data set;

using analytical results to predict whether the subsequent actions are likely to generate the defects that compose a second historic data set;

reviewing and correcting the performed action and the subsequent actions by stakeholders to create a fresh performed action once the performed action and the subsequent actions with high probability of causing the defects are identified;

appending the fresh performed action with the first and second historic data sets for amending the defects to construct a prediction model for further subsequent actions;

applying Feature Subset Selection (FSS) in a data processing for creating data sets for a data analysis to create the prediction model; and functioning the prediction model to mine possible defects before executing the subsequent actions.

2. The action-based in-process software defect prediction (ABDP) method as claimed in claim 1, wherein an undersampling is applied to the data sets with the FSS to increase precision of predictions for the subsequent actions so that the defects are predicted prior to execution of the subsequent actions.

3. The action-based in-process software defect prediction (ABDP) method as claimed in claim 2, wherein the subsequent actions are executed in sequence or parallel to achieve objectives of the software project.

4. The action-based in-process software defect prediction (ABDP) method as claimed in claim 1, wherein execution of an action is divided into three stages comprising:

planning stage;

executing stage; and reporting stage.

5. The action-based in-process software defect prediction (ABDP) method as claimed in claim 4, wherein the planning stage is performed to have plan description of an action, required resources of the action and work products of the action to execute the action and obtain actual efforts of the performed action; and wherein a set of features is defined to collect data from the performed action.

6. The action-based in-process software defect prediction (ABDP) method as claimed in claim 5, wherein the planning stage further comprises predefined features divided into two groups in name of antecedent features and subsequent features respectively gathered before and after executing.

7. The action-based in-process software defect prediction (ABDP) method as claimed in claim 1, wherein the execution of each tasks of WBS comprises several sequences of actions where each sequence of actions started from a root action and included subsequent reactions (R actions) or defect actions (D actions).

8. The action-based in-process software defect prediction (ABDP) method as claimed in claim 7, wherein the D actions is selectively caused by the defects, the R actions is selectively caused by other actions.

9. The action-based in-process software defect prediction (ABDP) method as claimed in claim 1, wherein a data preprocessing is further included in the ABDP to create the prediction model and comprises steps of:

data transformation;

data validation;

feature selection by the FSS;

data filtering; and data sampling.

10. The action-based in-process software defect prediction (ABDP) method as claimed in claim 9, wherein a data sampling step is performed to sample a major class by using an under-sampling and generates the second historic data set to be analyzed by a data analysis component.

11. The action-based in-process software defect prediction (ABDP) method as claimed in claim 10, wherein the step of data sampling is applied to address rarity problem that causes a decision tree to classify subsequent actions to the major class; and the under-sampling is used with the C4.5 algorithm to address imbalance problems.

12. The action-based in-process software defect prediction (ABDP) method as claimed in claim 1, wherein the prediction model is kept updated when the performed actions and the defects are reported during software project execution to create an updated prediction model.

* * * * *